US008317982B2

United States Patent
Kumar

(10) Patent No.: US 8,317,982 B2
(45) Date of Patent: Nov. 27, 2012

(54) FGEPSC (FLARED, GAS EXHAUST, PNEUMATIC, SATURATION AND CONDENSATION) PROCESS AND SYSTEM

(76) Inventor: Subrahmanyam Kumar, Adyar Chennal (IN)

( * ) Notice: Subject to any disclaimer, the term of this patent is extended or adjusted under 35 U.S.C. 154(b) by 905 days.

(21) Appl. No.: 12/293,869

(22) PCT Filed: Mar. 15, 2007

(86) PCT No.: PCT/IN2007/000106
§ 371 (c)(1),
(2), (4) Date: Sep. 22, 2008

(87) PCT Pub. No.: WO2007/108008
PCT Pub. Date: Sep. 27, 2007

(65) Prior Publication Data
US 2009/0032388 A1    Feb. 5, 2009

(30) Foreign Application Priority Data

Mar. 22, 2006 (IN) .............................. 509/CHE/2006
Apr. 12, 2006 (IN) .............................. 665/CHE/2006
Apr. 25, 2006 (IN) .............................. 748/CHE/2006

(51) Int. Cl.
*C02F 1/16* (2006.01)
*C02F 1/66* (2006.01)
*B01D 3/10* (2006.01)

(52) U.S. Cl. ....... 203/11; 159/16.1; 159/24.1; 159/24.2; 159/47.3; 159/48.1; 159/DIG. 8; 159/DIG. 15; 159/DIG. 16; 159/DIG. 23; 203/10; 203/25; 203/26; 203/49; 203/71; 203/73; 203/86; 203/90; 203/91; 203/DIG. 8; 203/DIG. 17; 203/DIG. 20; 210/737; 210/774

(58) Field of Classification Search ................. 159/16.1, 159/24.1, 24.2, 43.1, 47.3, 48.1, DIG. 8, 159/DIG. 15, DIG. 16, DIG. 23; 203/10, 203/11, 25, 26, 49, 71, 73, 86, 90, 91, DIG. 8, 203/DIG. 17, DIG. 20; 210/737, 774; 60/320, 60/654

See application file for complete search history.

(56) References Cited

U.S. PATENT DOCUMENTS

| 3,446,712 A | 5/1969 | Othmer |
| 3,890,207 A | 6/1975 | Chapman |
| 4,909,899 A * | 3/1990 | Kiiskila ...................... 159/47.3 |
| 5,050,511 A * | 9/1991 | Hallett et al. ................. 110/346 |
| 5,925,223 A * | 7/1999 | Simpson et al. ................. 203/11 |
| 2001/0029732 A1 | 10/2001 | Bachmann |
| 2007/0012187 A1 | 1/2007 | Deen |

FOREIGN PATENT DOCUMENTS

| DE | 10052918 A1 | 3/2002 |
| GB | 1508203 | 4/1978 |

(Continued)

OTHER PUBLICATIONS

J. Cohen, et al., Utilization of Waste Heat From a Flue Gasses Up-Stream Gas Scrubbing System, Desalination, vol. 139, Issues 1-3, Sep. 20, 2001, pp. 1-6.

(Continued)

*Primary Examiner* — Virginia Manoharan
(74) *Attorney, Agent, or Firm* — Brooks Kushman P.C.

(57) ABSTRACT

The present invention discloses a process and apparatus for utilization of waste heat of flue gas liberated from different heat sources to provide high quality water from sea/brackish.

20 Claims, 3 Drawing Sheets

FOREIGN PATENT DOCUMENTS

| IN | 211832 | 11/2007 |
|---|---|---|
| JP | 55147186 | 11/1980 |
| JP | 61216791 | 9/1986 |

OTHER PUBLICATIONS

Recovery of Water from Boiler Flue Gas, (html version of www.netl.doe.gov/publications/factsheets/project/Proj433.pdf), Nov. 2006.

Power-Gen International 2005—Las Vegas, Nevada, (html version of www.powergeneration.siemens.com/download/pool/PGI2005 Copen et al.).

MED and TVC of IDE, (www.ide-tech.com/code/tab_3.html), Jun. 10, 2005.

ALAQUA-SEEC-flow diagram.

\* cited by examiner ved
FGEPSC (FLARED, GAS EXHAUST, PNEUMATIC, SATURATION AND CONDENSATION) PROCESS AND SYSTEM

RELATED APPLICATION

This application claims priority under U.S.C. §371 to application PCT/IN2007/000106 filed Mar. 15, 2007 which is incorporated in its entirety by reference.

FIELD OF INVENTION

This invention relates to the enhanced, dynamic, efficient and economic production of high purity water in large quantity by utilizing, the sensible heat and latent heat present in waste flue gas/exhaust gases being released/dissipated into the atmosphere. Further this invention relates to the unique process of evaporation, saturation and evaporative-condensation using brackish/sea water and fossil fuel fired boiler flue gas or turbine exhaust gases being liberated/dissipated into the atmosphere or the hot gases that are generated during combustion of hydrocarbon gases, when they are flared into the atmosphere in a flare stack. The source of the waste heat as mentioned above can be from several sources, combustion of fossil fuel like Coal, Lignite, Natural gas, Coke oven gas etc., Sugarcane baggase burning and also the heat present in furnace exhaust gas and flared hydrocarbon gases. Waste heat present in the flue gases generated from the heat sources other than that mentioned above can also be used for the production of high purity water from sea/brackish water in large quantity.

BACKGROUND

Conventionally, good quality water from sea/brackish water is being produced with known process of REVERSE OSMOSIS, MULTI STAGE FLASH EVAPORATION or with the conventional EVAPORATION & CONDENSATION method. All these above methods require huge quantity of energy by way of electricity and/or thermal energy to evaporate/separate water from brackish/sea water. The FGEPSC (FLARED, GAS EXHAUST, PNEUMATIC, SATURATION AND CONDENSATION) process and system envisages the effective utilization of the waste heat and water vapor, (present in the fossil fuel fired boiler flue gas and turbine exhaust gases that are being liberated into the atmosphere, and also heat available in flared hydrocarbon gases being dissipated into the atmosphere). Waste heat present in the flue/exhaust gases generated from heat sources other than that mentioned above can also be used for the production of high purity water in large quantity as stated above by desalination of brackish/sea water.

OBJECT OF INVENTION

It is therefore the object of this invention to improve & dynamically enhance the performance of the process for the production of large quantity of high purity water at very low overall production cost. Maintaining a low operating cost as well as ensuring low initial investment achieves this.

The object of the present invention is to provide a method by which high purity water in large quantity can be obtained using waste heat as the main source of energy.

It is further object of the present invention to conceptualize/demonstrate a process and a system by which high purity water can be obtained by using the waste heat in flue gas/exhaust gas/flared hydrocarbon gas/furnace exhaust gas in combination with sea/brackish water.

It is still another object of the present invention to utilize the latent heat released by the water vapors present in the flue gas during phase change.

It is also the object of the invention to extract/separate water already present in the flue gas thus increasing the overall quantity of production of high purity water generated.

It is also the object of the invention that during the process of generating high purity water from brackish/sea water, to simultaneously scrub, clean and cool the flue gas/exhaust gas/furnace exhaust gases/hydrocarbon flared gas before they are dissipated into the atmosphere It is the object of the invention to effectively and efficiently utilize the heat still present in the flue gas/exhaust gas being liberated into the atmosphere as waste heat so that the overall efficiency of the boiler/thermal power plant is greatly improved.

It is also the objective of the invention to mitigate corrosion (of heat exchanger tubes—due to the presence of acidic media in the flue gas/exhaust gas) by ensuring dilution of the acidic media itself through condensation of large volume of water from the flue gas/exhaust gas/furnace exhaust gases/hydrocarbon flared gas before they are dissipated into the atmosphere It is also the objective of the invention to use the flue gas/exhaust gas/flared gas as a container to separate and hold water from sea/brackish water, since the flue gas/exhaust gas/hydrocarbon flared gas are almost immune to the corrosive and erosive nature of sea/brackish water.

It is also the objective of the invention to make the flue gas/exhaust gas/flared hydrocarbon gas more amenable for selective separation of Carbon dioxide gas present in it thus facilitating Carbon sequestration.

SUMMARY OF INVENTION

The FGEPSC (FLARED, GAS EXHAUST, PNEUMATIC, SATURATION AND CONDENSATION) process and system incorporates extraction of water from sea/brackish water using the sensible and latent heat present in fossil fuel fired flue gas/exhaust gas, flared hydrocarbon gas and furnace exhaust. The heat and water vapor present in these gases and which are normally exhausted/dissipated into the atmosphere and usually/normally termed as "waste heat," shall be utilized as the main source of energy for desalination of seawater to generate high purity water. Normally the sea and atmospheric air are used as a heat sink to cool the hot flue gas/exhaust gases. In the envisaged system, most of the "waste heat" available in the hot flue gas/exhaust gas/furnace exhaust gases/hydrocarbon flared gas is effectively and efficiently used to extract water from sea/brackish water before the gases are dissipated into the atmosphere.

Further this process is environment friendly as suspended particulate matters and sulphur bearing chemical compounds present in the flue gas/exhaust gases/furnace exhaust gases/hydrocarbon flared gas are cleaned, trapped and settled before the gases dissipated into the atmosphere.

The object of this invention is to effectively utilize the sensible heat and latent heat present in flue gas/exhaust gases and which are normally liberated/dissipated into the atmosphere, (like the exhaust gas generated by a Natural gas fired turbine coupled to a Waste Heat Recovery Boiler, or flue gas generated by a fossil fuel fired steam boiler/hot water generator, or flared hydrocarbon gases or furnace exhaust gas) for the production of large quantity of high purity water from brackish/sea water at very low production cost, by maintaining a low operating cost and ensuring low initial investment.

BRIEF DESCRIPTION

The FGEPSC (FLARED, GAS EXHAUST, PNEUMATIC, SATURATION AND CONDENSATION) process and system envisages the effective and efficient utilization of the heat and water vapor present in fossil fired flue gas/turbine exhaust gas/flared hydrocarbon gases/furnace exhaust which are normally dissipated/liberated into the atmosphere and are usually termed as "waste heat," for desalination of sea/brackish water to generate high purity water in large quantity.

In thermal power plants using coal fired boilers, enormous quantity of flue gas (typically around 800 Metric Tons per Hour—210 MW capacity power plant) is liberated/dissipated into the atmosphere. This flue gas contains water (typically, around 12% of the total quantity of flue gas) and the flue gas is also hot, (typically ranging from around 100 to 220 degrees Centigrade) and termed as waste heat. About 300 Tons per Hour of high purity water can be obtained from seawater by processing around 200 Tons per Hour of hot flue gas at around 160° C.

In another embodiment, typically a 50 MW Natural gas fired turbine, generating electric power, around 200 Tons per hour of exhaust gas at around 500 degree C. will be generated. This extremely hot exhaust gas from the gas turbine is routed to a waste heat recovery unit, to recover maximum heat in the form of high-pressure steam or hot water. The hot exhaust gas at around 115 degree Centigrade leaves the waste heat recovery unit and is dissipated into the atmosphere as "waste heat" through a stack. It is envisaged that by processing around 200 Tons per hour of this exhaust gas at around 115 degree Centigrade in the present Process and System, about 400 Tons per hour of high purity water can be generated from seawater.

In yet another embodiment of the present invention, hot waste gasses also termed as flared hydrocarbon gas (at around 1000 degree Centigrade) is made to pass through equipment (E & S unit), evaporation and scrubbing unit, where brackish/sea water is sprayed into the stream of hot waste gasses. The hot waste gasses are sucked from the vicinity of the flare, ensuring there is no physical contact with the flare stack. Whenever required an external blower will provide sufficient atmospheric air to complete the combustion of partially/unburnt chemical compounds in the waste flared gasses. The E&S unit is installed, engulfed within the duct carrying the waste gasses and is installed near the top of the duct where the hot waste gasses enters the duct. Please refer (Diagram—2 and 3). Appropriate provision is made for moving the tip of the duct D-1 backward & forward, upward & downward, sideways swivel movement. All these movements can be operated electrically, mechanical or hydraulically. It is envisaged that by processing around 200 Tons per hour of waste gasses (flared hydrocarbon gases) at around 1200 degree Centigrade in the present Process and System, about 900 Tons per Hour of high purity water can be generated from seawater.

Higher the temperatures of HOT flue gas/exhaust gas more water can be evaporated from seawater during direct scrubbing of the gases with seawater. Coal fired thermal power plant flue gas will have higher temperature (100-220 degree Centigrade) compared to Natural Gas fired combined cycle thermal power plant (110-120 degree Centigrade), flared hydro carbon gas and furnace exhaust temperature are very high (1000-1500 degree Centigrade).

Of the total quantity of high purity water that will be generated, more than 90% of the water will be of very high purity (typically water containing TDS—Total Dissolved Solids of less than 5 ppm—Parts Per Million).

The figures indicated hereinabove are indicative and will vary depending upon location, ambient conditions, quality and quantity of fossil fuel being fired, quality & quantity of combustible hydrocarbon gasses being flared, type and size of furnace. The quality, quantity and temperature of flue gas/exhaust gas as well as availability, quality and temperature of sea/brackish water are also important parameters governing the operation of the envisaged process and apparatus.

DETAILED PROCESS DESCRIPTION

Refer Diagram: 1

Figure 1:
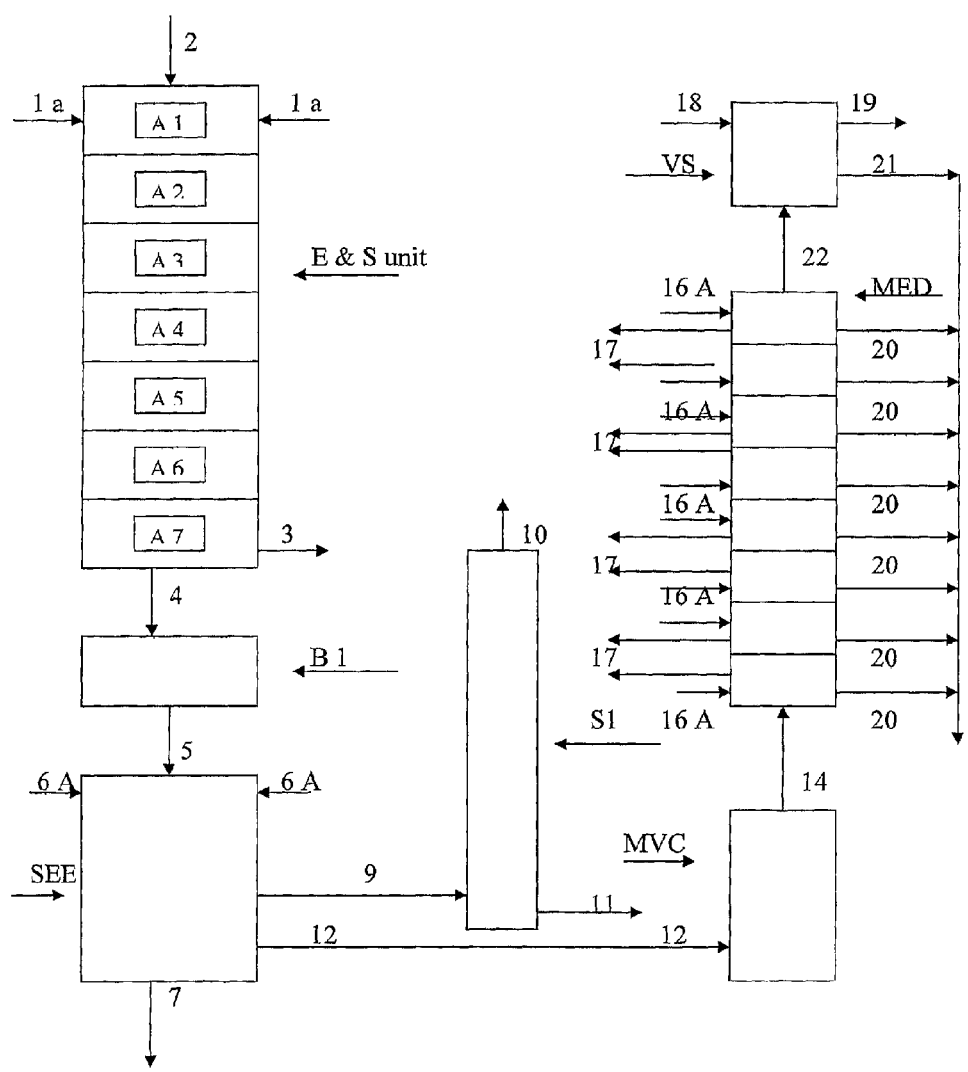
FIG. 1 schematically illustrates a flared, gas exhaust, pneumatic, saturation, and condensation system according to at least one embodiment.
Figure 2:
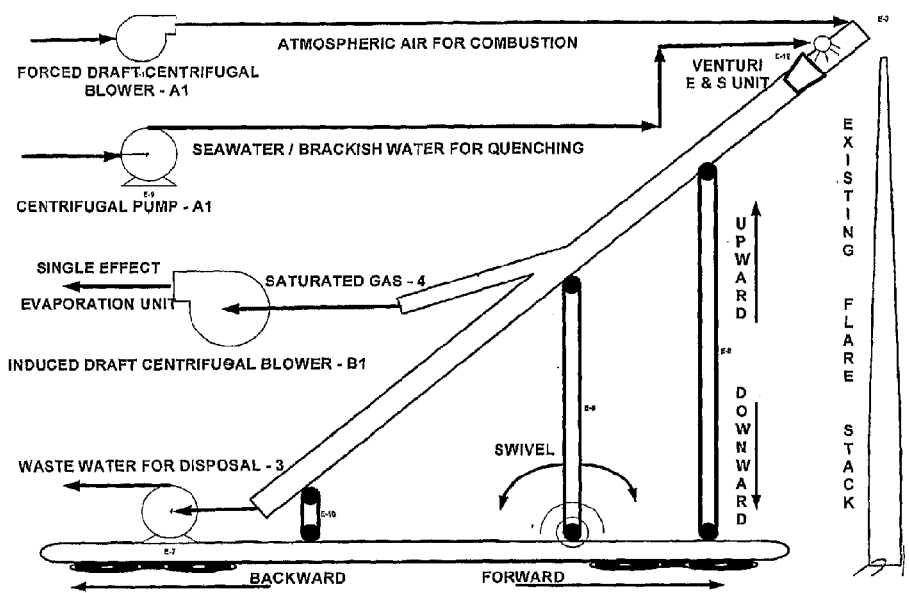
FIG. 2 schematically illustrates a flared, gas exhaust, pneumatic, saturation, and condensation system according to another embodiment.
Figure 3:
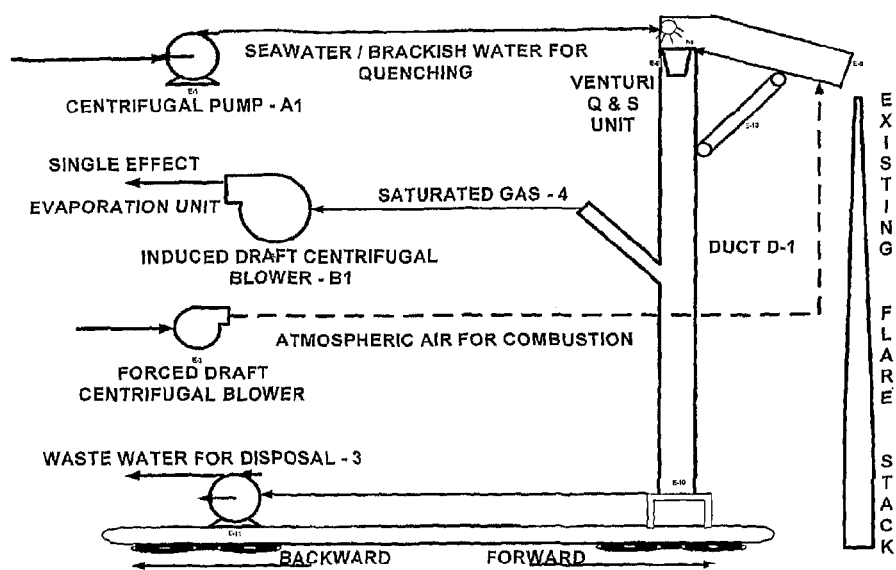
FIG. 3 schematically illustrates a flared, gas exhaust, pneumatic, saturation, and condensation system according to another embodiment.

As per the present invention with the help of a blower B1, hot flue gas (around 160° C.) in the case of Coal fired thermal power plant, hot waste gas (around 1000° C.) in the case of flared hydrocarbon gases from flare stack and hot exhaust gas (around 110° C.) from a Natural gas fired Combined Cycle Power Plant is made to pass through equipment (E & S unit), evaporation and scrubbing unit, where sea/brackish water is sprayed into the stream of hot flue gas/exhaust gas. Hot flue gas enters the unit through inlet No. 2 and seawater is sprayed through several nozzles No. 1a.

Seven different unit operations sequentially, consecutively & simultaneously take place inside this equipment (E & S unit)

A1 is the mixing zone where thorough mixing of sea/brackish water and flue gas/exhaust gas is ensured by strategic placement of nozzles and by fine atomized spraying of the sea/brackish water into the gas.

A2 is the quenching zone where the temperature of the hot flue gas is drastically lowered from around 160° C. to around 60° C. in the case of Coal fired thermal power plant; and from around 1200° C. to around 70° C. in the case of waste gases from flare stack; and around 110° C. to near 65° C. in the case of hot exhaust gas liberated by Natural gas fired Combined Cycle power Plant.

A3 is the evaporation zone where some quantity of water from the sea/brackish water evaporates using the sensible heat that is present in the flue gas and combines/mixes with the gas itself.

A4 is the neutralization zone where most of the acidic media present in the flue gas/exhaust gas is neutralized by the alkaline media present in the sea/brackish water.

A5 is the saturation zone where it is ensured that the flue gas/exhaust gas is now fully saturated with water at the requisite temperature.

A6 is the scrubbing zone where the suspended particulate matters present in the flue gas/exhaust gas is entrapped in the sea/brackish water making the flue gas relatively free of particulate matters.

A7 is the separation zone where the moisture laden flue gas/exhaust gas is separated from the sea/brackish water now containing suspended particulate matters.

The sea/brackish water now containing suspended particulate matters leave the equipment (E & S unit)—Evaporation and Scrubbing unit through outlet No.: 3. The moisture laden flue gas passes through outlet No.: 4 sucked through the induced draft blower B1 to enter the Single Effect Evaporative-Condenser (SEEC unit). The number of effects in a Single Effect Evaporative-Condenser (SEEC unit) depends upon the temperature and volume of saturated flue gas/exhaust gases, entering it.

The warm moisture laden flue gas now enters the bank of tubes in the Single Effect Evaporative-Condenser (SEEC unit), through inlet No.: 5. Requisite vacuum is maintained on the shell side of the Single Effect Evaporative-Condenser (SEEC unit), while cold sea/brackish water is sprayed on to the top of the tubes. The sea/brackish water enters the Single Effect Evaporative-Condenser (SEEC unit) through nozzles No.: 6a and after some water in the sea/brackish water evaporates due to the heat and vacuum, leaves the Single Effect Evaporative-Condenser (SEEC unit) through outlet No.: 7. The evaporated low pressure water vapor leaves the Single Effect Evaporative-Condenser (SEEC unit) through outlet No.: 8 on its way to the Mechanical Vapor Compressor (MVC unit), which is also maintaining the vacuum in the Three Stage Single Effect Evaporative-Condenser (SEEC unit). The cold flue gas now leaves the Three Stage Single Effect Evaporative-Condenser (SEEC unit) through outlet No.: 9 to enter the Stack S1 for dissipation into the atmosphere through outlet No.: 10. At the bottom of the stack S1, condensed water droplets in the flue gas is separated and removed as good quality water through outlet No.: 11.

The Mechanical Vapor Compressor (MVC unit) while maintaining the vacuum in the Single Effect Evaporative-Condenser (SEEC unit) also sucks the low-pressure vapor generated in it through inlet No.: 12. The Mechanical Vapor Compressor (MVC unit) then compresses the low-pressure vapor to raise its temperature before releasing the compressed vapor to the Multiple Effect Distillation (MED unit) through outlet No.: 14. The Mechanical Vapor Compressor (MVC unit) is operated with the help of an electric motor. The Mechanical Vapor Compression (MVC) units are only to increase/enhance the total quantity of high purity water generated. FGEPSC (FLARED, GAS EXHAUST, PNEUMATIC, SATURATION AND CONDENSATION) process and system can be operated without installing Mechanical Vapor Compression (MVC) units. Depending on the required temperature and pressure of the compressed low-pressure vapors entering the Multiple Effect Distillation (MED unit), a number of Mechanical Vapor Compression (MVC) units may be placed in series for each stage of the Single Effect Evaporative-Condenser (SEEC unit). Higher the temperature and pressure of the compressed low-pressure vapors more quantity of high purity water will be generated by the Multiple Effect Distillation (MED unit)

The compressed low-pressure vapor now enters the bank of tubes in the first effect of the Multiple Effect Distillation (MED unit) through nozzle No.: 15, as a source of heat, wherein the low-pressure vapor condenses and is removed as high quality water. Requisite vacuum is maintained on the shell side of the Multiple Effect Distillation (MED unit), while cold sea/brackish water is sprayed on to the top of the tubes. The sea/brackish water enters the Multiple Effect Distillation (MED unit) through nozzles No.: 16a and after some water in the sea/brackish water evaporates due to the heat and vacuum leaves the Multiple Effect Distillation (MED unit) for re-circulation or disposal to sea through a common outlet No.: 17.

The evaporated low-pressure water vapor leaves the first effect of the Multiple Effect Distillation (MED unit) to enter the tube side of the second effect of the Multiple Effect Distillation (MED unit) as the source of heat. The process is repeated in a series of effects, which are being maintained under vacuum. In each effect sea/brackish water is sprayed on to the tubes forcing some water to evaporate due to the heat & vacuum while later condensing inside the tubes as high quality water.

All the condensed high quality water is collected and removed from the Multiple Effect Distillation (MED unit) through outlet No.: 20. A vacuum apparatus VS1 consisting of condensers and vacuum pump shall maintain the requisite vacuum in all the effects of the Multiple Effect Distillation (MED unit) by sucking the ultimate and final low-pressure vapors through inlet No.: 22. Cold seawater will enter the condenser through inlet No.: 18 as coolant and leave through outlet No.: 19 to be returned to the sea. The condensed water vapor will leave the condenser through outlet No.: 21.

Necessary instrumentation and control system shall be provided for safe operation. The temperature and volume of flue gas entering and leaving the system, the temperature and quantity of seawater entering and leaving the system, the pressure, temperature and volume of low-pressure and compressed low-pressure water vapor will be controlled and measured with appropriate measuring and controlling apparatus. The electrical energy consumed for normal operation of the system will be measured and recorded. Periodic chemical analysis of the sea/brackish water and flue gas/exhaust gases entering and leaving the system will be carried out with suitable measuring and analyzing apparatus.

Salient Features of the Invention

The invention offers a high & efficient utilization of waste heat, —(sensible heat and latent heat which is otherwise being dissipated into the atmosphere/sea), to generate large quantity of good quality water.

The overall thermal efficiency of the (Coal/Natural gas fired) Thermal Power Plant is improved. Due to the additional & maximum utilization of the available heat still remaining in the flue gas, and presently being dissipated into the atmosphere as waste heat.

Taking cognizant of the fact, that huge quantity of heat energy in the form of latent heat is available in the hot flue gas, presently being dissipated into the atmosphere. This is mainly due to the presence of large quantity of water vapor in the flue gas liberated by the Coal/Natural gas fired thermal power station.

Apt utilization of the flue gas itself for separating water from seawater, knowing very well that the flue gas is almost inert and can withstand the erosive and corrosive nature of seawater.

During the process of separation of water from seawater with the hot flue gas liberated by the coal fired boiler of a thermal power station, the flue gas itself gets cleaned & scrubbed, leading to a better & cleaner environment. Particulate matters are trapped in the scrubbing liquid (seawater); and the alkaline nature of seawater neutralizes the corrosive oxides of Sulphur.

Scrubbing, cleaning and quenching of the hot flue gas makes it more amenable to selective separation of Carbon dioxide gas present in it, thus facilitating Carbon sequestration.

Drastically drop the temperature of the highly corrosive hot flue gas, so that exotic material of construction (like Titanium/Monel/Inconel etc.) need not be recommended to withstand corrosion due to the presence of oxides of sulphur in the flue gas. Carbon steel vessels lined with Rubber/Plastics will suffice.

The condensation of large quantity of water from the flue gas will ensure, dilution of the traces of un-scrubbed acidic media still present in the flue gas. (Traces of oxides of Sulphur that escaped seawater scrubbing). The dilution of acidic media by condensed water is so high that it makes the acidic media practically non-corrosive. Therefore the Heat Exchanger tubes can be made of Stainless steel or Aluminum Ensuring that the temperature of the motive steam, the main energy source for the Multiple Effect Distillation unit, is not raised above 70° C. This leads to low temperature evaporation and condensation in the Multiple Effect Distillation unit. Tending towards drastic reduction of scaling of heat exchanger tubes by salts present in the corrosive seawater. Thus Aluminum tubes can be recommended instead of expensive Titanium tubes.

Taking full advantage of the fact that the cost of electric power for a Thermal Power plant is far lower compared to the cost of electric power otherwise made available commercially to the final consumer.

I claim:

1. A process for the utilization of waste heat for desalination of a source water including at least one of sea water or a brackish water having suspended particles to generate water having a total dissolved solids amount of less than 5 parts per million (ppm) using a waste heat source having at least one of a source gas having an acidic media selected from a group consisting of a furnace exhaust gas, a flared hydrocarbon gas, a gas from burning of sugarcane baggase, and a gas having a carbon component and including at least one of a flue gas and an exhaust gas from combustion of fossil fuel, the source gas having an elevated temperature relative to the source water, the fossil fuel selected from a group consisting of a coal, a lignite, a natural gas, and a coke-oven gas, the process comprising of the following steps of:

guiding the source gas from a plant where it is generated to an evaporating and scrubbing (E & S) unit using a blower and a first duct disposed on the E & S unit;

spraying a scrubbing liquid into the E & S unit through several spraying nozzles to form a polluted scrubbing liquid;

discharging the polluted scrubbing liquid from the E & S unit through an outlet for further treatment;

mixing directly the source gas with the source water in the E & S unit lowering of the temperature of the source gas to form a cooled source gas;

evaporating an amount of water from the source water;

neutralizing the acidic media present in the cooled source gas with an alkaline media present in the source water;

saturating the cooled source gas with water vapor to form a warm moisture laden source gas;

cleansing of the warm moisture laden source gas by trapping the suspended particles;

separating the warm moisture laden source gas from the polluted scrubbing liquid;

directing the warm moisture laden source gas into a bank of tubes placed inside a single effect evaporative-condenser (SEEC) unit having a second duct, a stack, and a plurality of stages, each stage including a bank of tubes and a shell side having a vacuum, the tubes being disposed adjacent to and about the shell side;

spraying the source water through several nozzles disposed on top of the bank of tubes;

cooling of the warm moisture laden source gas inside the bank of tubes;

condensing a portion of the warm moisture laden source gas to form desalinated water;

releasing heat during the condensing step to form a low temperature heat source, the temperature of the low temperature heat source being less than the warm moisture laden source gas temperature;

exchanging the low temperature heat source in the shell side of the SEEC unit, forming a low-pressure water vapor having a pressure below atmospheric pressure;

discharging the low-pressure water vapor from the SEEC unit through the second duct;

condensing in the SEEC stack a first water portion having total dissolved solids in an amount of less than 5 ppm from the low-pressure water vapor;

discharging the first water portion from the SEEC stack;

dissipating a first portion of the low-pressure water vapor into the atmosphere through the SEEC stack;

directing a second portion of the low-pressure water vapor into a mechanical vapor compressor (MVC) unit;

compressing the low-pressure water vapor in the MVC unit increasing a temperature of the low-pressure water vapor to form a warm compressed water vapor;

directing the warm compressed water vapor to a multiple effect distillation (MED) unit having a plurality of distillation portions each having a tube side and a shell side in communication with the tube side within a first distillation portion and in communication with the tube side of a second distillation portion;

cooling the warm compressed water vapor in at least one tube side to form a second water portion having total dissolved solids amount of less than 5 ppm; and condensing the second water portion in at least one tube side; and discharging the water from the MED.

2. The process as claimed in claim 1, wherein the source of waste heat is selected from a group consisting of a heat energy plant, a factory, and a power station.

3. The process as claimed in claim 1, wherein the temperature of the source gas is in the range of about 100-220 degree C. the source gas has a water content in the range of 10-15%.

4. The process as claimed in claim 1, wherein the temperature of a first portion of the low-pressure water vapor is in the range of about 100-120 degree C. and having water content in the range of 20-25%.

5. The process as claimed in claim 1, wherein at least one of the flared hydrocarbon gas and the furnace exhaust gas has a temperature in the range of 1000-1500 degree C.

6. The process as claimed in claim 5, further comprising the steps of:

sucking the flared hydrocarbon gas and the furnace exhaust gas from the vicinity of the stack ensuring no physical contact of the flared hydrocarbon gas and furnace exhaust gas with the stack; and providing sufficient atmospheric air to complete the combustion of the flared hydrocarbon gas and the furnace exhaust gas.

7. The process as claimed in claim 1, wherein the cooling of the warm compressed water vapor in the MED unit includes directing a portion of the warm compressed air to at least two tube sides heating water from the sea water under vacuum;

evaporating the water from seawater; and condensing the water from the sea water to form the second water.

8. The process as claimed in claim 1, wherein the steps of directing the warm moisture laden source gas into a bank of tubes inside the SEEC, spraying the source water on top of the tubes, cooling the warm moisture laden source gas, and condensing the warm moisture laden gas to form desalinated water are repeated in a plurality of stages in the SEEC unit and the steps of directing the warm compressed water vapor into the MED, cooling the warm compressed water vapor to form the first water, and condensing the first water are repeated using at least two of the distillation portions in the MED unit.

9. The process as claimed in claim 1, wherein mixing the source water and the source gas, and lowering the temperature of the source gas, occur simultaneously while evaporating water from the source water.

10. The process as claimed in claim 1, further comprising the steps of:
   separating a portion of the carbon component from the source gas to form a sequestered carbon material; and
   providing the sequestered carbon material to a carbon sequestration process.

11. The process as claimed in claim 1, wherein the source gas includes at least two waste heat sources.

12. A process for use of waste heat for desalination of a source water including at least one of sea water or a brackish water having suspended particles to generate water having a total dissolved solids amount of less than 5 parts per million (ppm) using a waste heat source having at least one of a source gas having an acidic media component and an elevated temperature relative to ambient atmosphere, the process comprising the steps of:
   mixing sea water with the source gas, the sea water having an alkaline component and a lower temperature than the source gas;
   neutralizing the acidic media component with the alkaline component when mixing sea water with the source gas, the acidic media component including sulphur oxide;
   extracting heat from the source gas when mixing sea water with the source gas to form a cooled source gas;
   evaporating water from the sea water using the extracted heat to form a water vapor;
   saturating the cooled source gas with the water vapor to form a warm moisture laden source gas;
   directing the warm moisture laden source gas to a single effect evaporative condenser (SEEC) unit having a bank of tubes;
   cooling the bank of tubes having the warm moisture laden source gas; and
   condensing the liquid water from the warm moisture laden source gas to form a first desalinated water.

13. The process as claimed in claim 12, wherein the sea water includes a brackish water component.

14. The process as claimed in claim 12, wherein the source gas includes at least one of a flue gas and an exhaust gas.

15. The process as claimed in claim 12, further comprising the steps of:
   compressing the warm moisture laden source gas to form a warm compressed water vapor having a temperature of less than 70° C.;
   directing the warm compressed water vapor to multiple effect distillation (MED) unit;
   evaporating water from the warm compressed water vapor in the MED unit to evaporated water; and
   cooling the evaporated water in the MED unit to condense a second desalinated water.

16. A process for use of waste heat for desalination of a source water including at least one of sea water or a brackish water having suspended particles to generate water having a total dissolved solids amount of less than 5 parts per million (ppm) using a waste heat source having at least one of a source gas having an acidic media component and an elevated temperature relative to ambient atmosphere, the process comprising the steps of:
   mixing sea water with the source gas, the sea water having an alkaline component and a lower temperature than the source gas in a polymer-lined carbon steel vessel;
   neutralizing the acidic media component with the alkaline component when mixing sea water with the source gas;
   reducing the source gas temperature by an amount ranging from 45° C. to 1130° C. when mixing sea water with the source gas by extracting heat from the form a cooled source gas;
   evaporating water from the sea water using the extracted heat to form a water vapor;
   saturating the cooled source gas with the water vapor to form a warm moisture laden source gas; and
   directing the warm moisture laden source gas to at least one of an evaporative condenser unit or a distillation unit, condensing water from the warm moisture laden source gas when in at least one of the units to form a desalinated water.

17. The process as claimed in claim 16, wherein the bank of tubes include at least one of a stainless steel tube or an aluminum tube.

18. The process as claimed in claim 16, wherein the warm moisture laden source gas has a temperature of less than 70° C.

19. The process as claimed in claim 16, wherein the evaporative condenser unit is a single effect evaporative condenser (SEEC) having a plurality of stages.

20. The process as claimed in claim 16, wherein the distillation unit is a multiple effect distillation (MED) unit having a main energy source having a temperature of less than 70° C.

* * * * *